United States Patent [19]
Ebbert et al.

[11] Patent Number: 5,295,643
[45] Date of Patent: Mar. 22, 1994

[54] UNMANNED VERTICAL TAKE-OFF AND LANDING, HORIZONTAL CRUISE, AIR VEHICLE

[75] Inventors: Marvin D. Ebbert, San Diego; Russell G. Gustin, Jamul; Edward G. Horbett, San Diego; Jack J. Edwards, El Cajon; Clifton L. Adcock, San Diego, all of Calif.

[73] Assignee: Hughes Missile Systems Company, Los Angeles, Calif.

[21] Appl. No.: 997,007

[22] Filed: Dec. 28, 1992

[51] Int. Cl.⁵ .................. B64C 27/22; B64C 29/02
[52] U.S. Cl. .................. 244/7 B; 244/12.2; 244/12.5; 244/23 D
[58] Field of Search .......... 244/6, 7 B, 7 R, 7 A, 244/10, 12.2, 12.4, 12.5, 12.6, 23 B, 23 C, 23 D, 67, 82

[56] References Cited

U.S. PATENT DOCUMENTS

| | | | |
|---|---|---|---|
| 2,461,435 | 2/1949 | Neumann et al. | 244/23 C |
| 2,874,920 | 2/1959 | Mallinckrodt | 244/7 B |
| 2,968,453 | 1/1961 | Bright | 244/12.5 |
| 3,456,902 | 2/1969 | Visconti | 244/7 R |
| 4,037,807 | 7/1977 | Johnston et al. | 244/7 B |
| 4,196,877 | 4/1980 | Mutrux | 244/23 C |
| 4,566,699 | 1/1986 | Cucuzza | 244/23 C |
| 4,795,111 | 1/1989 | Moller | 244/23 C |

Primary Examiner—Michael S. Huppert
Assistant Examiner—Virna Lissi Ansley

[57] ABSTRACT

An unmanned air vehicle capable of vertical take-off and landing, hovering and high-speed horizontal cruise flight. A forward centerbody houses an engine and carries a single rotor assembly having a plurality of propellers lying in a plane substantially perpendicular to the centerline of the forward centerbody. A coaxial aft centerbody is secured to the aft end of the forward centerbody and typically houses the vehicle avionics. A plurality of stators extend outwardly of the aft centerbody, in a plane substantially parallel to the propellers. A single toroidal duct surrounds the rotor assembly and the stators and is secured to the stators. A plurality of movable control vanes are secured between the duct and aft centerbody aft of the stators. A flight control system, typically housed in the aft centerbody, controls the engine and the vanes to cause the vehicle to selectively move upwardly, downwardly, hover or translate to forward, horizontal, motion with the rotor in a plane within 80° of vertical. A sensor, cargo, or other payload may be carried at the forward end of the forward centerbody, extending well in front of the duct. The vehicle is highly maneuverable, light weight and safe for operation from a small area due to the ducted rotor.

21 Claims, 2 Drawing Sheets

UNMANNED VERTICAL TAKE-OFF AND LANDING, HORIZONTAL CRUISE, AIR VEHICLE

BACKGROUND OF THE INVENTION

This invention relates in general to air vehicles and, more specifically to unmanned air vehicles capable of vertical take-off, landing, hovering and high speed horizontal flight.

Conventional heavier-than-air aircraft utilize propellers or gas turbines to drive the aircraft through the air at a sufficient velocity that lift generated by a large wing is sufficient to maintain the aircraft in flight. While providing very high speeds from point to point over the earth, these aircraft require long runways for landing and take-off. A number of small, unmanned aircraft have been designed for reconnaissance and surveillance purposes, carrying various sensors and in some cases light weapons, such as in the case of small, homing, anti-radiation aircraft intended to detect and destroy radar transmitters. Generally, these unmanned aircraft use propellers due to the greater range when compared to jet engines. These aircraft require long runways for take-off and landing, or in some cases large catapult systems for take-off and large nets for retrieval, making them difficult to operate from ships or confined areas.

Helicopters have come into widespread use for carrying passengers or cargo over relatively short distances. The vertical landing and take-off characteristics make them especially useful on shipboard and in confined areas, such as roof tops. Helicopters are little used where long endurance or long distance flights are required because of their relatively high fuel consumption and low cross country speed. Attempts have been made to develop small helicopters for reconnaissance and surveillance purposes. Where large helicopters generally use an extended tail rotor to counteract rotor blade torque on the fuselage, small helicopter tend to use pairs of counter rotating rotor blade sets, increasing system complexity. Launch and recovery of small helicopters tends to be dangerous where the blades are rotating in a confined area. Further, miniature helicopters have very low cross country speed and relatively high fuel consumption so that they cannot cover large areas.

A compact, but pilot-carrying, helicopter is described by Velton in U.S. Pat. No. 3,584,810. The pilot rides between two vertically spaced, counter rotating, rotors positioned in narrow ducts, one above and one below the pilot. This is a complex and heavy arrangement, which if scaled down would not be effective for surveillance purposes, since a sensor between the rotors in place of the pilot would be effectively masked by the rotating blades except over a narrow horizontal band. Further, this helicopter would also have the speed and range limitations common to helicopters.

Aircraft have been designed that can take-off vertically, transition to horizontal flight, then transition back to vertical flight for landing. Some are "tail sitters" with the aircraft fuselage vertical on the ground. Others have pivoting engines or tilting wings to move propellers from a horizontal plane for take-off to a vertical plane for flight. Still others have elaborate duct systems moveable to direct jet exhaust vertically or horizontally. The mechanisms for transition between vertical and horizontal flight in these aircraft tend to be very heavy and complex. These aircraft generally have low payload capacities, often requiring horizontal take-off runs to achieve flight with the necessary fuel aboard to provide reasonable flight endurance.

Thus, there is a continuing need for light weight, simple and safe unmanned air vehicles for reconnaissance, surveillance, weapon delivery and the like that can take-off from and land vertically in confined areas while providing sufficient horizontal speed to furnish the necessary flight endurance for many surveillance purposes. The ability to carry a variety of sensors in a manner permitting sensing over a wide area is also needed.

SUMMARY OF THE INVENTION

The above noted problems, and others, are overcome in accordance with this invention by an unmanned air vehicle that is capable of vertical take-off from a confined area, transition to high speed horizontal flight, loitering for an extended period, including hovering as required, high speed return flight and safe vertical landing in the confined area. Basically, the air vehicle of this invention comprises coaxial forward and aft centerbodies, a rotor mounted on the forward centerbody with plural propellers extending outwardly of the centerbody, a single toroidal duct mounted on the aft centerbody by plural stators in a manner surrounding the rotor and stators and plural control vanes in the rotor airflow path aft of the stators.

Preferably, the forward centerbody houses an engine and associated components for driving the rotor and the aft centerbody houses system avionics, including the flight control electronics. The payload, typically surveillance sensors, is mounted on the forward end of the forward centerbody, well away from the rotor and duct.

The air vehicle's general arrangement provides for optimum payload positioning, excellent external aerodynamic characteristics, efficient packaging of equipment and optimum center-of-gravity positioning for stable transition between vertical to horizontal flight modes. In horizontal flight, the rotor lies in a plane inclined to the vertical at an angle that is proportional to the air vehicle's horizontal speed. At top speed the included angle is preferably nearly 80 degrees and at least best endurance speed it is preferably around 60 degrees. The included angle becomes 0 degrees at the hover case.

BRIEF DESCRIPTION OF THE DRAWING

Details of the invention, and of certain preferred embodiments thereof, will be further understood upon reference to the drawing, wherein.

DETAILED DESCRIPTION OF PREFERRED EMBODIMENTS

Figure 1:
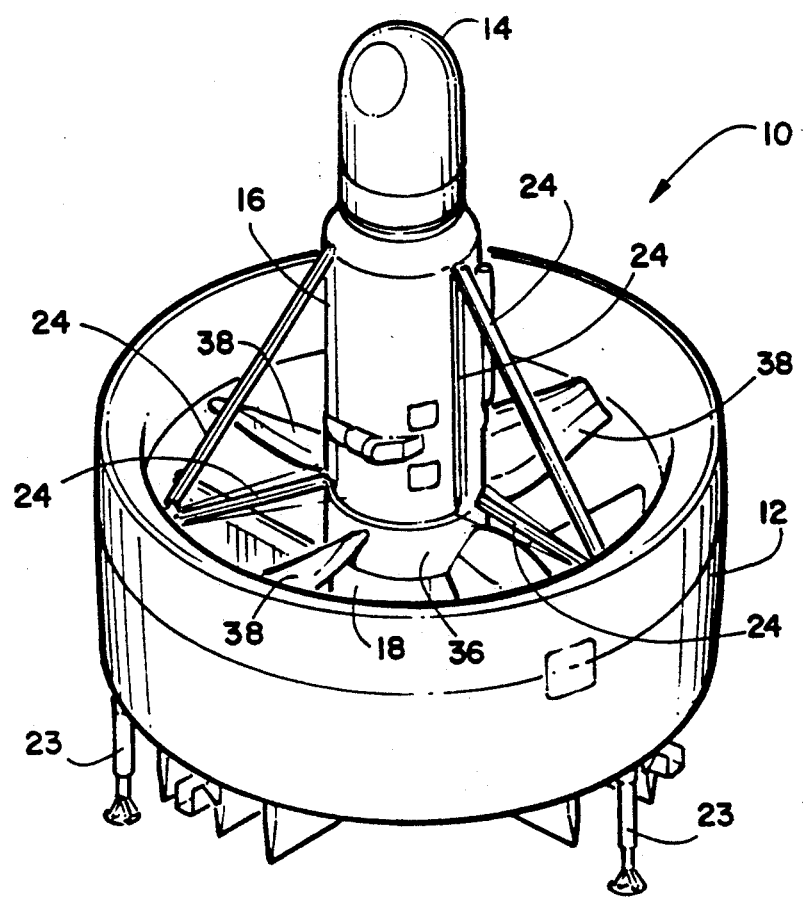
FIG. 1 is a perspective view of the air vehicle of this invention.
Figure 2:
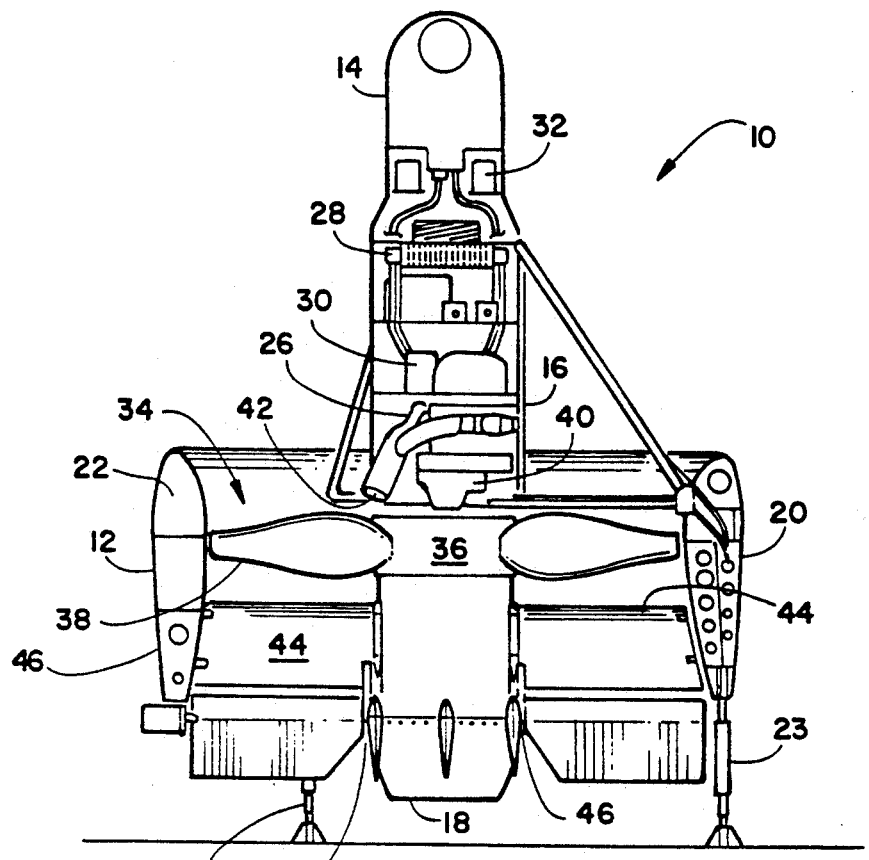
FIG. 2 is an elevation view of the air vehicle with portions of the duct cut-away for clarity.

Referring now to FIGS. 1 and 2, there is seen an air vehicle basically comprising an annular, toroidal duct 12 surrounding an axial assembly consisting of a payload 14 (typically a surveillance sensor), a forward centerbody 16 and an aft centerbody 18. These components are preferably streamlined (typically cylindrical) to permit smooth airflow through the annular space between duct 12 and centerbodies 16 and 18.

Duct 12 is basically formed from a closed cell foam core covered with a high strength fiber face sheet impregnated with a resin matrix material that bonds the fibers together and the sheet to the foam core. Any suitable foam core and face sheet materials may be used. For optimum results, a ROHACELL foam core and a Kevlar aramid fiber face sheet in an epoxy resin matrix are used. Duct 12 has a basic airfoil shape selected to provide aerodynamic lift during horizontal, cruise flight operations, with the inlet lip contoured to maximize take-off and hover performance. Airflow over the inner lip of duct 12, induced by the rotor 34, produces a positive thrust when the lip is generously contoured to provide an area on which the lower pressure created by the high velocity air stream can act. An internal diffuser ratio of about 1.2 (the ratio of exit area to the area of the duct at the rotor) is preferred since that ratio provides the maximum improvement in thrust capability of the vehicle by increasing the mass flow for a given power level.

We have found that for successful transition from vertical to horizontal flight, the air vehicle's center of gravity should be near the leading edge of duct 12. The general arrangement shown in FIGS. 1 and 2 places forward centerbody 16 and payload 14 sufficiently forward to meet this condition. The circular or toroidal configuration of duct 12 reduces induced drag by about 50% in comparison With a planar ring of the same span, because it has about twice the apparent mass area as the planar wing. In addition, the internal duct flow augments the lift throughout the horizontal flight angle of attack range by providing super-circulation as the result of the velocity added to the inclined slipstream. In addition, we have found that the unique combination of the annular wing and slipstream prevents flow separation up to angles of attack of about 15°, thereby eliminating the anticipated additional profile drag penalties associated with flight at these angles of attack.

Duct 12 includes a plurality, preferably three, of metal primary support frames 20 embedded in the foam core, as best seen in FIG. 2. The leading edge of duct 12 includes a plurality, preferably three, of equally spaced integral fuel tanks 22. The number and size of fuel tanks 22 is a trade-off between payload weight capacity and flight endurance. The location of the fuel tanks, approximately at the vehicle's center of gravity position makes the Position of the center of gravity relatively insensitive to the quantity of fuel on board.

A plurality, preferably three, energy absorbing or damped fluid landing struts 23, typically damped fluid or pneumatic struts, are mounted on primary frames 20 and extend below duct 12. These landing gear, shock absorbing, struts 23 are capable of carrying the bending loads imposed during landings in windy conditions. These struts eliminate any need for a conventional landing ring or skids used on conventional light weight helicopters.

Forward centerbody 16 is mounted on primary support frames 20 by the truss assembly made up of triangular assembly of mounting struts 24. The engine 26 and engine accessories such as radiator 281, generator 301 batteries 32, etc. are housed in forward centerbody 16. A rotor assembly 34 comprising a hub 36 and propellers 38 is mounted on forward centerbody 16 for rotation relative thereto. A gearbox 40 connects engine 26 to rotor hub 36. The engine exhaust ejector 42 directs exhaust gases into the duct to reduce infrared signature by mixing with duct airflow.

Propellers 38 are preferably made from wood or light weight composite material to minimize the rotational inertia and associated gyroscopic effects.

Figure 3:
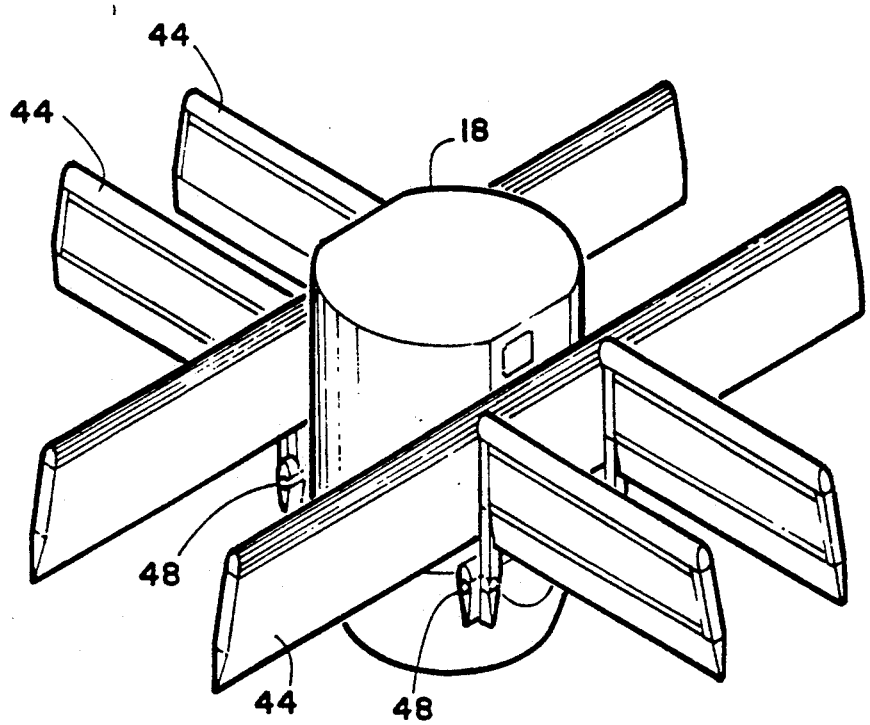
FIG. 3 is a detail perspective view of the aft centerbody and stator assembly.

As best seen in FIGS. 2 and 3, aft centerbody 18 is mounted on a plurality of stators 44 that extend between aft centerbody 18 and duct 16. Small frames 46 are embedded in the duct foam core to support the outer ends of stators 44. Stators 44 serve to straighten the propeller-produced swirling air flow through the duct to balance the propeller torque through the airframe, allowing the use of a single rotor 34 without requiring excessive control vane deflection. The stators have a symmetrical airfoil section for minimum drag and are preferably constructed of a closed cell foam core covered with a high strength fiber material in a resin matrix for an optimum strength-to-weight ratio. Aluminum spars extend through the core between the attachment points at aft centerbody 18 and duct 16. The leading edge of some stators 44 (or another lengthwise channel) may be hollow to provide a raceway for electrical wiring extending between the centerbodies and control vane actuators (as described below) or other components.

As seen in FIG. 3, stators 44 may be conveniently mounted by attaching one pair of stators 44 to opposite sides of aft centerbody 18, with additional stators 44 mounted perpendicular to the first set. Stators 44 may be angled or cambered to produce increased compensation for rotor torque during average engine operation, however, stator cords parallel to the duct longitudinal axis has been shown to be adequate. The control vane system, as detailed below, further compensates for engine torque characteristics at higher or lower speeds. Hinge mounts 48 are preferably mounted at the aft end of stators 44 as seen in FIG. 3 for mounting the control vanes.

Figure 4:
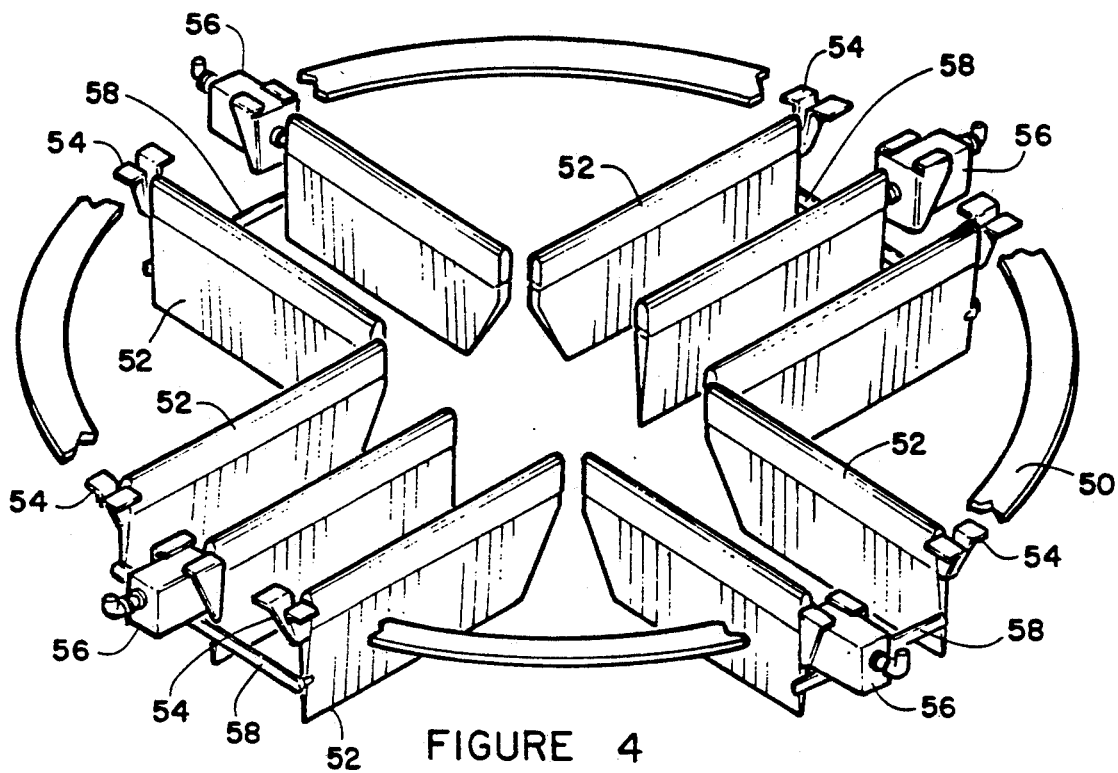
FIG. 4 is a detail perspective view of the control vane and actuator assembly.

The flight control system is shown in FIGS. 2 and 4. A circular spar is embedded in the aft region of duct 12, or forms the aft edge if a blunt edge is selected as seen, to support a plurality of control vanes 52. In some cases, for reduced duct drag, it will be preferred to add a feathered edge to the aft edge of duct 12.

While any suitable arrangement and number of control vanes 52 may be used, we have found that for Optimum performance two sets of three vanes 52 are installed normal to the pitch plane, in the exit flow of the duct, to produce pitching moment. Two sets of two vanes 52 are preferably installed nominal to the yaw plane to produce yaw moments. Differential deflection of opposite control vane sets produces a rolling moment. All control vanes 52 are preferably symmetrical airfoils with the hinge line preferably at about the quarter chord to minimize torque requirements for the actuators to rotate the control surfaces. Additionally, control vanes should be spaced one cord length apart and with the leading edge forward of the duct exit plane to maximize control effectiveness.

Control vanes 52 are preferably formed from closed cell foam materials, covered with a sheet of high strength fibers in a resin matrix, with an aluminum spar passing through each vane between the hinge points. This minimizes weight aft of the vehicle center-of-gravity.

As seen in FIG. 4, hinge brackets 54 are provided along spar 50 for hingedly mounting the outer ends of vanes 52. The inner ends of each vane 52 is mounted on a hinge point 48 (as seen in FIG. 3). One actuator 56 is mounted on circular spar 50 adjacent each set of vanes 52. Actuators 56 directly move one vane of each set, with links 58 between adjacent vanes 52 causing each set to move together. Any suitable conventional actuator may be used, typically hydraulically or electrically powered.

Placement of control vanes 52 in-line with, and immediately aft of, stators 44 allows the use of control vanes 52 at up to about 30° deflection without significant flow separation. This feature, combined with the use of six control vanes for pitch, provides sufficient control authority to transition from hover to cruise flight.

The flight control system is mounted within aft centerbody 18. Any suitable system may be used. Typically, an incorporated digital flight control system architecture uses attitude and rate information from gyros and an accelerometer cluster (housed in the aft centerbody) to stabilize the airframe by providing appropriate commands to the vane control actuators. These commands are generated by conventional autopilot algorithms that use a proportional-plus-integral controller in all three axes. Outer-loop commands (speed, altitude and heading) can be supplied in any conventional manner, such as by a radio link from the ground or from an on-board flight computer storing mission data. Typically, the mission data can be supplied in a manner similar to that used for modern cruise missiles so that the air vehicle is fully capable of autonomous mission execution from take-off through landing. When in the autonomous flight mode, the navigation solution may use the Global Positioning System to aid the inertial navigation, thereby producing high accurate three dimensional position and velocity information. A typical and available flight control system is the integrated flight management unit available from Honeywell International.

For an optimum combination of strength and light weight, most of the structure of the air vehicle, such as the housings for the centerbodies 16 and 18 and Payload 14, is formed from composite materials using high strength fibers, such as graphite, glass, aramids or the like, embedded in a resin matrix such as an epoxy resin. Metal components such as frames 20 and 46 and struts 24 are preferably formed or machined from aluminum or other lightweight metal. The interior of much of duct 12, stators 44 and vanes 52 are filled with a closed cell foam, typically a polyurethane or polyamide foam. The air vehicle, then, is very light in weight and easily handled on the ground and has high flight endurance.

Other applications, variations and ramifications of this invention will occur to those skilled in the art upon reading this disclosure. Those are intended to be included within the scope of this invention, as defined in the appended claims.

We claim:

1. An unmanned vertical take-off and landing, horizontal high-speed cruise, air vehicle which comprises:
    a forward centerbody;
    an engine housed within said forward centerbody;
    a single rotor assembly mounted on said forward centerbody and connected to said engine for rotation thereby;
    a plurality of spaced propellers extending outwardly from the rotor assembly;
    an aft centerbody having a forward end secured to an aft end of said forward centerbody, said forward and aft centerbodies being collinear and lying substantially along a vehicle centerline;
    a plurality of stators extending outwardly of said aft centerbody;
    a single toroidal duct assembly surrounding said rotor assembly and stators and secured to said stators;
    a plurality of control vanes extending between said duct and said aft centerbody aft of said stators; and
    flight control means for controlling said engine and control vanes to selectively cause the vehicle to move upwardly and downwardly with said rotor in a generally horizontal plane and to move horizontally with said rotor in a pane about 50 to 80 degrees to the horizontal.

2. The air vehicle according to claim 1 wherein a center of gravity of said vehicle is near a leading edge of said duct.

3. The air vehicle according to claim 1 wherein said duct has an airfoil shaped cross section adapted to increase thrust through said duct.

4. The air vehicle according to claim 1 further including means for carrying a payload located on a forward end of said forward centerbody.

5. The air vehicle according to claim 1 further including a plurality of fuel tanks evenly located within said duct around a leading edge of said duct and means for piping fuel at substantially equal rates from said tanks to said engine.

6. The air vehicle according to claim 1 wherein said forward centerbody is supported by a plurality of struts extending from said forward centerbody to a plurality of substantially equally spaced primary frames embedded in said duct.

7. The air vehicle according to claim 1 further including at least three substantially equally spaced energy absorbing struts extending downwardly from a plurality of primary frames in said duct to support said vehicle on the ground and absorb landing shock.

8. The air vehicle according to claim 1 wherein said duct, stators and control vanes are formed primarily from closed cell foam cores covered with face sheets comprising high strength fibers embedded in a resin matrix.

9. The air vehicle according to claim 1 wherein said control vanes comprise a set of three pitch vanes on each side of the aft centerbody installed normal to the pitch plane, adapted to provide pitching moments and a set of two yaw vanes on each side of the aft centerbody, adapted to provide yaw moments, said pitch and yaw vanes lying substantially perpendicular to each other and adapted to be differentially deflected to provide rolling moments.

10. The air vehicle according to claim 9 wherein said control vanes have symmetrical airfoils and are hinged at about the quarter chord.

11. The air vehicle according to claim 9 wherein at least some of said control vanes are placed directly aft of said stators whereby greater control vane deflection may be used without flow separation.

12. The air vehicle according to claim 1 wherein an inside surface of said duct is configured to provide an internal diffuser ratio of exit area of the duct to the area of the duct at said rotor of between 1.0 to 1.2 whereby the thrust capability of the vehicle is improved.

13. An unmanned vertical take-off and landing, horizontal high-speed cruise air vehicle which comprises:
    a forward centerbody;

means for housing a payload mounted on a forward end of said forward centerbody;

an engine housed within said forward centerbody;

a single rotor assembly mounted on said forward centerbody and connected to said engine for rotation thereby;

a plurality of spaced propellers extending outwardly from the rotor assembly;

an aft centerbody having a forward end secured to an aft end of said forward centerbody, said forward and aft centerbodies lying substantially along a vehicle centerline;

a plurality of stators extending outwardly of said aft centerbody;

a single toroidal duct assembly surrounding said rotor assembly and stators and secured to said stators, the duct being symmetrically oriented about the centerline of the vehicle;

a plurality of control vanes extending between said duct and said aft centerbody aft of said stators;

a plurality of fuel tanks within said duct, spaced substantially evenly around said duct;

said forward centerbody and payload housing being located a sufficient distance forward of said duct that the center of gravity of said vehicle is near a leading edge of said duct; and flight control means for controlling said engine and control vanes to selectively cause the vehicle to move upwardly and downwardly with said rotor in a generally horizontal plane and to move horizontally with said rotor in a plane within about 45° of vertical.

14. The air vehicle according to claim 13 wherein said duct has an airfoil shaped cross section adapted to increase thrust through said duct.

15. The air vehicle according to claim 13 wherein said forward centerbody is supported by a plurality of struts extending from said forward centerbody to a plurality of substantially equally spaced primary frames embedded in said duct.

16. The air vehicle according to claim 13 further including at least three substantially equally spaced pneumatic struts extending downwardly from a plurality of primary frames in said duct to support said vehicle on the ground.

17. The air vehicle according to claim 13 wherein said duct, stators and control vanes are formed primarily from closed cell foam cores covered with face sheets comprising high strength fibers embedded in a resin matrix.

18. The air vehicle according to claim 13 wherein said control vanes comprise a set of three pitch vanes on each side of the aft centerbody installed normal to the pitch plane, adapted to provide pitching moments and a set of two yaw vanes on each side of the aft centerbody, adapted to provide yaw moments, said pitch and yaw vanes lying substantially perpendicular to each other and adapted to be differentially deflected to provide rolling moments.

19. The air vehicle according to claim la wherein said control vanes have symmetrical airfoils and are hinged at about the quarter chord.

20. The air vehicle according to claim 18 wherein at least some of said control vanes are placed directly aft of said stators whereby greater control vane deflection may be used without flow separation.

21. The air vehicle according to claim 13 wherein an inside surface of said duct is configured to provide an internal diffuser ratio of exit area of the duct to the area of the duct at said rotor of between about 1.0 and 1.2 whereby the thrust capability of the vehicle is improved.

* * * * *